(12) United States Patent
Brockbank et al.

(10) Patent No.: US 10,999,101 B2
(45) Date of Patent: *May 4, 2021

(54) FLOW SYNCHRONIZATION

(71) Applicant: Metaswitch Networks Ltd, Enfield (GB)

(72) Inventors: Robert Brockbank, San Francisco, CA (US); Alex Pollitt, San Francisco, CA (US); Michael Curtis, Sacramento, CA (US); Shaun Crampton, San Francisco, CA (US)

(73) Assignee: Metaswitch Networks, Ltd, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,827

(22) Filed: May 3, 2018

(65) Prior Publication Data

US 2018/0359118 A1    Dec. 13, 2018

Related U.S. Application Data

(63) Continuation of application No. 14/267,813, filed on May 1, 2014, now Pat. No. 10,003,474.

(51) Int. Cl.
*H04L 12/64* (2006.01)
*H04L 12/851* (2013.01)
*H04L 12/721* (2013.01)
*H04L 12/24* (2006.01)

(52) U.S. Cl.
CPC ...... *H04L 12/6418* (2013.01); *H04L 41/0672* (2013.01); *H04L 45/38* (2013.01); *H04L 47/2483* (2013.01); *H04L 41/5096* (2013.01)

(58) Field of Classification Search
CPC .......... H04L 12/6418; H04L 41/0672; H04L 41/5096; H04L 45/38; H04L 47/2483
See application file for complete search history.

(56) References Cited

U.S. PATENT DOCUMENTS

| 2007/0153685 | A1* | 7/2007 | Moon | H04W 8/26 370/229 |
| 2011/0273988 | A1  | 11/2011 | Tourrilhes | |
| 2011/0317559 | A1* | 12/2011 | Kern | H04L 41/0816 370/235 |

(Continued)

*Primary Examiner* — Huy D Vu
*Assistant Examiner* — Bao G Nguyen
(74) *Attorney, Agent, or Firm* — Newport IP, LLC; Han Gim

(57) ABSTRACT

A controller node receives a list of a first plurality of flows programmed on a network switch. The controller node extracts a flow cookie value from a flow cookie data field of each flow in the first plurality of flows on the received list and calculates a session identifier on the basis of the extracted cookie values. At least one add flow command is transmitted from the controller node to the network switch to program a second plurality of flows on the network switch. The at least one add flow command comprises flow cookie values in the flow cookie data fields of each of the flows in the second plurality of flows which are set equal to the calculated session identifier. At least one delete flow command is transmitted from the controller node to the network switch to delete programming of the first plurality of flows on the network switch.

20 Claims, 2 Drawing Sheets

(56) References Cited

U.S. PATENT DOCUMENTS

| | | | |
|---|---|---|---|
| 2012/0014287 A1* | 1/2012 | Kim | H04W 4/08 370/254 |
| 2013/0128746 A1* | 5/2013 | Yedavalli | H04L 45/42 370/238 |
| 2013/0201821 A1 | 8/2013 | Yamato et al. | |
| 2013/0304915 A1 | 11/2013 | Kawai | |
| 2014/0201738 A1* | 7/2014 | Choi | G06F 9/45533 718/1 |
| 2015/0009828 A1* | 1/2015 | Murakami | H04L 47/20 370/235 |
| 2015/0078386 A1 | 3/2015 | Jackson | |
| 2015/0249587 A1 | 9/2015 | Kozat et al. | |
| 2015/0319094 A1* | 11/2015 | Brockbank | H04L 47/2483 370/216 |
| 2018/0131602 A1* | 5/2018 | Civanlar | H04L 49/3009 |

\* cited by examiner

FLOW SYNCHRONIZATION

CROSS-REFERENCE TO RELATED APPLICATIONS

This application is a continuation under 35 U.S.C. § 120 of U.S. application Ser. No. 14/267,813, filed May 1, 2014. The contents of the referenced patent application is incorporated by reference in its entirety.

BACKGROUND OF THE INVENTION

Field of the Invention

The present disclosure relates to synchronization. In particular, but not exclusively, the present disclosure relates to synchronizing flows in a packet-switched network.

Description of the Related Technology

OpenFlow is a communications protocol that provides centralized control of the forwarding plane of a series of network switches or routers. A centralized controller node programs flow tables on the OpenFlow enabled switch which are used to control packet routing on the switch.

Flow tables contain sets of match parameters with associated actions. An individual flow is uniquely identified by a well-defined set of match parameters and a match priority. The match parameters are used to quantify packets arriving on the switch, for example the match parameters include ingress port and destination media access control (MAC) address. A packet arriving at the switch is matched against the highest priority flow and the actions associated with that flow are then performed on the packet, for example the action could be to route the packet to another port.

Management of the flow tables is handled by sending in OpenFlow commands with a set of match parameters and actions. Rows may be added, deleted or updated based on the request parameters. Bulk matching of flows can be handled by wildcarding the match parameters or the match priority. For example, to bulk delete a set of flows it is possible to send in a delete action with a set of exact match parameters and the remaining match parameters wildcarded; in this case, all flows matching the exact set of match parameters will be deleted.

In addition to the match parameters, the priority and the actions, each programmed flow can have a cookie assigned to it. This is an arbitrary 64-bit number that is chosen and programmed by the controller node. The cookie is not used to uniquely identify the flow. However, when performing flow matches for bulk queries and updates, the cookie value can (in addition to the match and match priority) be used to identify a group of flows. For example, it is possible to delete all flows with a cookie value of 1000. A cookie mask value allows a further restriction such that a match is made only on the masked cookie values. For example, it is possible to delete all flows whose lowest 3 bits are set to 110.

The controller node is responsible for calculating and programming which flows are configured on the switch. In the event of a connection failure (for example, a transient network glitch, a switch restart, a controller restart, etc.), the controller node must synchronize the flows that are programmed on the switch to ensure the switch is in the correct state when the switch reconnects.

Since there are large number of match parameters associated with a flow, there is a large amount of flow-matching code that needs to be implemented in the OpenFlow protocol stack. Implementing these matches, especially when taking into consideration wildcarded match parameters could potentially be error prone simply due to the large number of parameters. Furthermore, different versions of the OpenFlow specification, where there may be additional match parameters, further complicate this match processing.

SUMMARY

According to embodiments, there is a method for synchronizing flows in a packet-switched network, the method comprising: receiving at a controller node, a list of a first plurality of flows programmed on a network switch; at the controller node, extracting a flow cookie value from a flow cookie data field of each flow in the first plurality of flows on the received list; at the controller node, calculating a session identifier on the basis of the extracted cookie values; transmitting at least one add flow command from the controller node to the network switch to program a second plurality of flows on the network switch, wherein the at least one add flow command comprises flow cookie values in the flow cookie data fields of each of the flows in the second plurality of flows which are set equal to the calculated session identifier; and transmitting at least one delete flow command from the controller node to the network switch to delete programming of the first plurality of flows on the network switch.

According to embodiments, there is apparatus for use in synchronizing flows in a packet-switched network, the apparatus comprising at least one processor, and at least one memory including computer program code, the at least one memory and the computer program code being configured to, with the at least one processor, cause the apparatus at least to: receive at a controller node, a list of a first plurality of flows programmed on a network switch; at the controller node, extract a flow cookie value from a flow cookie data field of each flow in the first plurality of flows on the received list; at the controller node, calculate a session identifier on the basis of the extracted cookie values; transmit at least one add flow command from the controller node to the network switch to program a second plurality of flows on the network switch, herein the at least one add flow command comprises flow cookie values in the flow cookie data fields of each of the flows in the second plurality of flows which are set equal to the calculated session identifier; and transmit at least one delete flow command from the controller node to the network switch to delete programming of the first plurality of flows on the network switch.

According to embodiments, there is a computer program product comprising a non-transitory computer-readable storage medium having computer readable instructions stored thereon, the computer readable instructions being executable by a computerized device to cause the computerized device to perform a method for synchronizing flows in a packet-switched network, the method comprising: receiving at a controller node, a list of a first plurality of flows programmed on a network switch; at the controller node, extracting a flow cookie value from a flow cookie data field of each flow in the first plurality of flows on the received list; at the controller node, calculating a session identifier on the basis of the extracted cookie values; transmitting at least one add flow command from the controller node to the network switch to program a second plurality of flows on the network switch, wherein the at least one add flow command comprises flow cookie values in the flow cookie data fields of each of the flows in the second plurality of flows which are set equal to the calculated session identifier; and transmitting at least one delete flow command from the controller node to the network switch to delete programming of the first plurality of flows on the network switch. Further features of embodiments will become apparent from the following description of preferred embodiments of the present disclosure, given by way of example only, which is made with reference to the accompanying drawings.

DETAILED DESCRIPTION OF CERTAIN INVENTIVE EMBODIMENTS

Embodiments of the present disclosure provide a simplified approach to managing the synchronization of the programmed flows a network switch such as an OpenFlow controlled network switch after switch reconnection. Embodiments utilize a cookie identifier to act as a session identifier that can be used to distinguish flows that are expected and flows that are not.

Embodiments of the present disclosure make use of the fact that a flow is uniquely identified by the match parameters and flow priority. A flow is not identified by the actions/instructions associated with the flow. Therefore, if two flows with identical match/priority, but different instructions are added, the second flow will replace the first.

Figure 1:
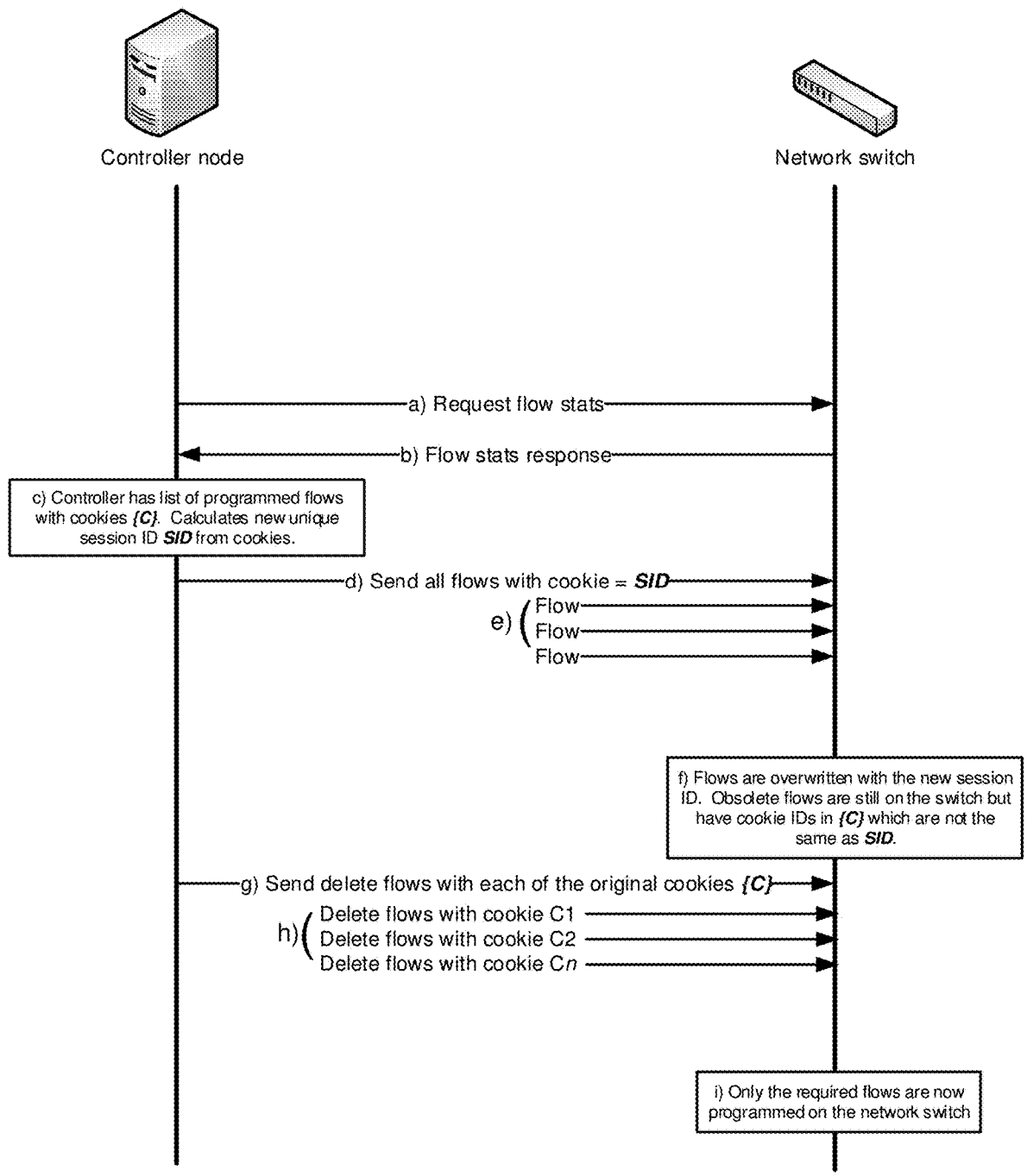
FIG. 1 is a flow diagram according to one or more disclosed embodiments.

The present disclosure comprises measures, including methods, apparatus and computer program products, for synchronizing flows in a packet-switched network according to embodiments. FIG. 1 shows a flow diagram according to embodiments.

In step a), a controller node transmits to a network switch, a request to provide a list of flows programmed on the network switch.

In step b), in response to the transmitted request, a list of a first plurality of flows programmed on a network switch is transmitted from the network switch to the controller node.

In step c), the controller node, extracts a flow cookie value from a flow cookie data field of each flow in the first plurality of flows on the received list. Here the extracted flow cookie values could for example comprise a set $\{C\}$ having n elements (or 'members') comprising cookie values C1, C2, C3, . . . , Cn. The controller node now calculates a session identifier (denoted 'SID' in FIG. 1) on the basis of the extracted cookie values.

In embodiments, the calculated session identifier comprises a unique session identifier. In embodiments, the session identifier is calculated to be different to any of the session identifiers calculated from extracted flow cookie values. In embodiments, the session identifier is calculated to be different to any of the extracted flow cookie values. In embodiments, the session identifier is calculated to be a value one higher than the highest of the extracted flow cookie values.

In step d), the controller node transmits at least one add flow command from the controller node to the network switch to program a second plurality of flows on the network switch. In such embodiments, the at least one add flow command comprises flow cookie values in the flow cookie data fields of each of the flows in the second plurality of flows which are set equal to the calculated session identifier. In the embodiments depicted in FIG. 1, item e) depicts three separate add flow commands being transmitted from the controller node to the network switch, but other embodiments may involve sending more or fewer than three add flow commands and an add flow command may be operable to instruct the network switch to add more than one flow at a time.

In step f), the network switch carries out programming of the flows which were instructed in the one or more add flow commands received from the controller node. Note that at this time, one or more obsolete flows may still be programmed on the network switch which have cookie values contained in a set $\{C\}$ which are not the same as the calculated session identifier.

In step g), the controller node transmits at least one delete flow command to the network switch to delete programming of the first plurality of flows on the network switch. In the embodiments depicted in FIG. 1, item h) depicts three separate delete flow commands (for deleting cookies C1, C2 and Cn respectively) being transmitted from the controller node to the network switch, but other embodiments may involve sending more or fewer than three delete flow commands A delete flow command may be operable to instruct the network switch to delete more than one flow at a time.

Item i) of FIG. 1 indicates that once the network switch has carried out deletion of the first plurality of flows instructed in the at least one delete flow command of steps g)/h), only the flows in the second plurality (i.e. those required to be programmed by the controller node) are now programmed on the network switch.

In embodiments, the at least one delete flow command identifies to the network switch the first plurality of flows which are to be deleted on the basis of at least part of the respective flow cookie values extracted from the received list.

In embodiments, the at least part comprises one or more cookie mask bits.

In embodiments, the at least part comprises one or more cookie masks bits, and the transmitted at least one delete flow command wildcards all flow match parameters except for the extracted flow cookie values and/or one or more cookie masks bits.

Figure 2:
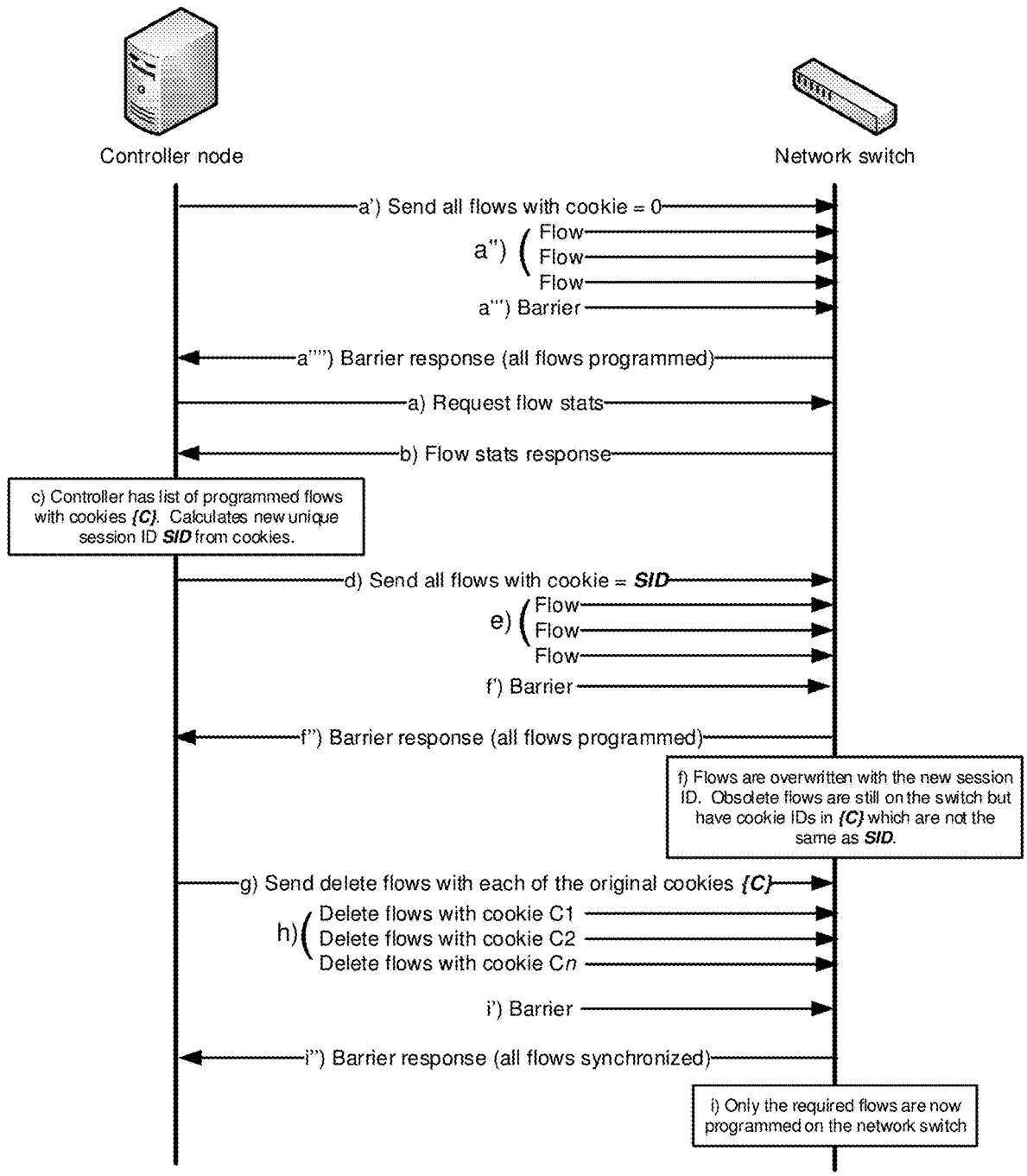
FIG. 2 shows a flow diagram according to one or more disclosed embodiments.

FIG. 2 is a flow diagram according to embodiments. FIG. 2 contains similar elements to FIG. 1; for example steps/items a) to i) of FIG. 2 are performed in a similar manner to steps/items a) to i) of FIG. 1 described above.

In step a), prior to receipt of the list at the controller node, the controller node transmits at least one initial add flow command to the network switch to program the second plurality of flows on the network switch. In such embodiments, the at least one add flow command comprises flow cookie values in the flow cookie data fields of each of the flows in the second plurality of flows which are each set to a given predetermined value. In the embodiments depicted in FIG. 2, step a") depicts three separate add flow commands being transmitted from the controller node to the network switch, but other embodiments may involve sending more or fewer than three add flow commands. An add flow command may be operable to instruct the network switch to add more than one flow at a time. In the embodiments depicted in FIG. 2, step a') shows the given predetermined value being an example value of zero, but in other embodiments, the given predetermined value could be a different value.

In embodiments, the transmitted at least one initial add flow command comprises a request for notification when the second plurality of flows have been programmed on the network switch; such a request for notification may be referred to as a barrier request and is indicated as such in step a''') of FIG. 2. In embodiments, the network switch transmits a notification that the second plurality of flows have been programmed on the network switch to the controller node in step a''''); such a notification may be referred to as a barrier response and is indicated as such in step a'''') of FIG. 2.

In embodiments, the transmitted at least one add flow command comprises a request for notification when the second plurality of flows have been programmed on the network switch; such a request for notation may be referred to as a barrier request and is indicated as such in step f') of FIG. 2. In embodiments, the network switch transmits a notification to the controller node in step f'') notifying the controller node that the second plurality of flows have been programmed on the network switch; such a notification may be referred to as a barrier response.

In embodiments, the transmitted at least one delete flow command comprises a request for notification when the first plurality of flows have been deleted on the network switch; such a request for notification may be referred to as a barrier request and is indicated as such in step i') of FIG. 2. In embodiments, the network switch transmits a notification to the controller node in step i'') notifying the controller node that the first plurality of flows have been deleted on the network switch; such a notification may be referred to as a barrier response.

In embodiments, the list is received from the network switch after reconnection of a connection failure between the controller node and the network switch.

In embodiments, the first plurality comprises at least one flow which is not in the second plurality, or the second plurality comprises at least one flow which is not in the first plurality.

In embodiments, the network switch is configured to operate the OpenFlow protocol and the first plurality of flows and the second plurality of flows comprise flows programmed according to the OpenFlow protocol.

In embodiments, the at least one add flow command and the at least one delete flow command relate to flows programmed with one or more match parameters and a match priority.

Embodiments can be described by a set of actions performed chronologically by a controller node after network switch reconnection, The actions may include one or more of the following steps:

1. Send down all of the required flows to the network switch (e.g. using one or more add flow commands such as OpenFlow OFPFC_ADD commands) assigning a cookie of zero to each flow. The controller node terminates the add flow command(s) with a barrier request and waits for the response before continuing. The barrier request is used to enable correct serialization of the requests. All requests sent in prior to the barrier request are processed before the barrier request. A barrier response from the network switch is thus an indication that all preceding messages have been processed. This initial stage of sending down all flows with a 0 cookie value assists in programming all of the required flows on the network switch as quickly as possible after reconnection.

2. Send a request (e.g. using an OpenFlow OFPC_FLOW_STATS command) to obtain a complete list of the programmed flows.

3. Extract the cookie from each of the flows programmed on the network switch.

4. Calculate a new session identifier from the list of cookies. In some embodiments, the session identifier is chosen to be a value one greater than the highest cookie value. However, if this happens to be higher than the highest value the cookie data field can contain (e.g. max(UINT64) for a 64 bit cookie field), then the session identifier can be wrapped and chosen to be a value that is not the same as one of the programmed cookies.

5. Re-program all of the required flows, setting the cookie value for each flow to be equal to the calculated session identifier. This will overwrite the flows programmed in step 1. and update them to use the new cookie. Again, a barrier message can be used to determine when the flows are programmed.

6. Send in requests to delete all flows with a cookie value that does not match the current session identifier. Since the list of cookies has already been determined, this requires sending one or more delete flow commands (e.g. OpenFlow OFPFC_DELETE commands) that matches on each of the original cookies to the network switch. The delete command(s) wildcards all match parameters, including priority, except for the cookie and cookie mask. The cookie mask is set to force an exact cookie match; in OpenFlow for example, this involves using a cookie value that has all bits set (so for a 64 bit number this is equivalent to $2^{64}-1$). A barrier request may also be used here to indicate when the delete actions have completed and thus the flows synchronized.

The controller node does not need to check whether each flow on the network switch is required. All flow matching is handled by the network switch.

During synchronization, old flows which are no longer required are deleted. According to embodiments, the number of delete requests required to sync up the flows is reduced since the deletes are performed on a per-cookie basis rather than on a per-flow basis. Deleting flows using flow cookie identifiers according to embodiments, rather than by individual flow, is more efficient (i.e. fewer delete requests are sent) as it can generally be expected that multiple flows will have the same flow cookie identifier. This is particularly true if multiple (or all) controllers that control a set of network switches utilize embodiments described herein.

In embodiments, the flow cookie value is a 64-bit number. In embodiments, a universally unique identifier (UUID) (for example, as standardized by the Open Software Foundation (OSF)) can be employed to uniquely identify a session, for example if all 64-bits of the cookie are used for this purpose. However, certain bits of the cookie may be reserved for a particular use, in which case, a calculated unique cookie can be employed according to embodiments.

A controller node such as an OpenFlow controller may consist of multiple applications that make their own decisions about which flows they want to program. The flow cookie can also be used to identify an owning component by reserving some of the bits of the flow cookie for this purpose. Since the flow match also utilizes a flow mask, embodiments described herein can be used with a selection of the cookie bits.

In embodiments, the upper n bits of the flow cookie can be used to represent a specific application within the controller node. (i.e. the application identifier can be regarded as a small integer value ($<2^n$) left-bit-shifted by (64-n) bits. In embodiments, the value of the flow cookie is the bitwise OR of the application identifier and the session identifier. In embodiments, the session identifiers are extracted from the flow cookies by masking out the upper n bits of the flow cookie (i.e. perform a bitwise AND (&) of the cookie value and $2^{(64-n)}-1$. In embodiments, a single session identifier can be used across all of the different applications. A new session identifier can be chosen for example according to embodiments described above. In embodiments, when programming the cookie on the flow, the cookie value is the session identifier bitwise-ORed (|) with the application identifier.

In embodiments, the controller node may wish to synchronize flows on a per-application basis. In this case, after programming down the required flows for a specific application, the controller node can perform cookie-wide deletes for each cookie whose upper n-bits match the application identifier and have the wrong "session identifier".

Embodiments comprise transmitting at least a first add flow command from the controller node to the network switch to program a third plurality of flows on the network switch, wherein the at least first add flow command comprises flow cookie values in the flow cookie data fields of each of the flows in the third plurality of flows which comprise one or more bits set to identify a first application and the calculated session identifier in the other flow cookie data field bits, and transmitting at least a second add flow command from the controller node to the network switch to program a fourth plurality of flows on the network switch, wherein the at least second add flow command comprises flow cookie values in the flow cookie data fields of each of flows in the fourth plurality of flows which comprise one or more bits set to identify a second, different application and the calculated session identifier in the other flow cookie data field bits. In such embodiments, the transmitted at least one delete flow command identifies the first plurality of flows as, flows having flow cookie values with bits matching the one or more bits set to identify the first application, but with other bits which do not match the calculated session identifier, or flows having flow cookie values with bits matching the one or more bits set to identify the second application, but with other bits which do not match the calculated session identifier.

Blanket deleting of flows based solely on session identifier may result in transient "blackhole" conditions. In embodiments, deleting of the flows is performed in a particular order to ensure that packets are always processed correctly. For example, suppose two flows are installed, one covering a blanket match on a subnet and the other covering an Internet Protocol (IP) address that is an exception to the blanket rule. If the exception rule is removed first, traffic matching that rule will be routed according to the blanket match which may end up black-holing the traffic to that destination until the blanket match flow is removed.

Provided all controllers of a network switch are employing the same flow cookie-calculations according to embodiments, then certain bits of the flow cookie could be reserved for specifying a flow programming order. This programming order can be used to safely remove flows in a particular order to avoid any temporary traffic blackholes. For example, in embodiments, the upper bits of the flow cookie are used to indicate a flow programming order. The removal of flows based on invalid cookie identifiers can then be handled in reverse order according to embodiments. In the case that a reconnection of the network switch to the controller results in a smaller set of flows being programmed, then the order in which flows are programmed according to embodiments becomes especially important.

In embodiments, the transmitted at least one delete flow command indicates an order in which at least two different flows in the first plurality of flows should be deleted on the network switch. In some such embodiments, the deletion order is indicated in one or more bits of the cookie data fields of the at least two different flows which are reserved for indicating the order of flow deletions.

The above embodiments are to be understood as illustrative examples of the present disclosure. Further embodiments of are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method for synchronizing flows in a packet-switched network, the method comprising, at a controller node:
   receiving a list of first flows programmed on a network switch;
   extracting a flow cookie value from each flow in the received list of programmed first flows;
   choosing a session identifier having a value that is not the same as one of the extracted cookie values;
   transmitting at least one add flow command to the network switch to program second flows on the network switch with flow cookie values equal to the session identifier; and
   transmitting at least one delete flow command to the network switch to delete flows on the network switch having cookie values matching the extracted cookie values,
   wherein the flow cookie values of each of the first and second flows are not used to uniquely identify each flow in the first and second flows, and
   wherein each flow in the first and second flows is identified by a unique identifier, the unique identifier being distinct from the flow cookie value of the each flow in the first and second flows.

2. The method according to claim 1, wherein the at least one delete flow command identifies the cookie values of the first flows using one or more cookie mask bits.

3. The method according to claim 1, wherein the at least one delete flow command identifies the cookie values of the first flows using one or more cookie masks bits, and
   wherein the transmitted delete flow command wildcards all flow match parameters except for the extracted flow cookie values and/or the one or more cookie masks bits.

4. The method according to claim 1, wherein the session identifier is chosen to be a value one higher than the highest of the extracted flow cookie values.

5. The method according to claim 1, comprising, at the controller node, prior to receiving the list of first flows, transmitting at least one initial add flow command to the network switch to program initial flows on the network switch with flow cookie values set to a given predetermined value.

6. The method according to claim 1, comprising, at the controller node, transmitting to the network switch a request to provide a list of flows programmed on the network switch,
   wherein the received list of first flows is received from the network switch in response to the transmitted request.

7. The method according to claim 1, wherein the list of first flows is received from the network switch after reconnection of a connection failure between the controller node and the network switch.

8. The method according to claim 1, wherein the transmitted at least one add flow command comprises a request for notification when the second flows have been programmed on the network switch, the method comprising:
   receiving, at the controller node from the network switch, notification that the second flows have been programmed on the network switch.

9. The method according to claim 1, wherein the at least one delete flow command comprises a request for notification when the flows have been deleted on the network switch, the method comprising:
receiving, at the controller node from the network switch, notification that the flows have been deleted on the network switch.

10. The method according to claim 1, wherein the first flows comprise at least one flow which is not in the second flows.

11. The method according to claim 1, wherein the at least one delete flow command indicates an order in which at least two different flows in the first flows should be deleted on the network switch.

12. The method according to claim 1, wherein the network switch is configured to operate the OpenFlow protocol and the first flows and the second flows comprise flows programmed according to the OpenFlow protocol.

13. The method according to claim 1, wherein the at least one add flow command and the at least one delete flow command relate to flows programmed with one or more match parameters and a match priority.

14. A system for use in synchronizing flows in a packet-switched network, the system comprising:
at least one memory including computer program code; and at least one processor in data communication with the at least one memory, the at least one processor configured to, at a controller node:
receive a list of a first flows programmed on a network switch;
extract a flow cookie value from each flow in the received list of programmed first flows;
choose a session identifier having a value that is not the same as one of the extracted cookie values;
transmit at least one add flow command to the network switch to program second flows on the network switch with flow cookie values equal to the session identifier; and
transmit at least one delete flow command to the network switch to delete flows on the network switch having cookie values matching the extracted cookie values,
wherein the flow cookie values of each of the first and second flows are not used to uniquely identify each flow in the first and second flows, and
wherein each flow in the first and second flows is identified by a unique identifier, the unique identifier being distinct from the flow cookie value of the each flow in the first and second flows.

15. A non-transitory computer-readable storage medium comprising computer executable instructions, which, when executed by a processor, cause a computerized device to perform a method for synchronizing flows in a packet-switched network, the method comprising, at a controller node:
receiving a list of first flows programmed on a network switch;
extracting a flow cookie value from each flow in the received list of programmed first flows;
choosing a session identifier having a value that is not the same as one of the extracted cookie values;
transmitting at least one add flow command to the network switch to program second flows on the network switch with flow cookie values equal to the session identifier; and
transmitting at least one delete flow command to the network switch to delete flows on the network switch having cookie values matching the extracted cookie values,
wherein the flow cookie values of each of the first and second flows are not used to uniquely identify each flow in the first and second flows, and
wherein each flow in the first and second flows is identified by a unique identifier, the unique identifier being distinct from the flow cookie value of the each flow in the first and second flows.

16. The method according to claim 1, wherein the second flows comprise at least one flow which is not in the first flows.

17. The method according to claim 1, wherein the controller node is configured to operate the OpenFlow protocol and the at least one add flow command to the network switch is made according to the OpenFlow protocol.

18. The method according to claim 1, wherein the controller node is configured to operate the OpenFlow protocol and the at least one delete flow command to the network switch is made according to the OpenFlow protocol.

19. The method according to claim 1, wherein the controller node is configured to operate the OpenFlow protocol and the list of first flows is received according to the OpenFlow protocol.

20. The method according to claim 5, wherein the transmitted at least one initial add flow command comprises a request for notification when the second plurality of flows have been programmed on the network switch, the method comprising:
receiving, at the controller node from the network switch, notification that the second plurality of flows have been programmed on the network switch.

* * * * *